(12) United States Patent
Wu et al.

(10) Patent No.: US 10,277,750 B2
(45) Date of Patent: Apr. 30, 2019

(54) METHOD AND SYSTEM FOR IMPROVING ECHO IN HANDS-FREE CALL OF MOBILE TERMINAL

(71) Applicant: Huizhou TCL Mobile Communication Co., LTD, Hui Zhou (CN)

(72) Inventors: Wenfei Wu, Hui Zhou (CN); Zhihua Wu, Hui Zhou (CN); Xiulu Jin, Hui Zhou (CN); Siqin Feng, Hui Zhou (CN)

(73) Assignee: HUIZHOU TCL MOBILE COMMUNICATION CO., LTD, Hui Zhou (CN)

( * ) Notice: Subject to any disclaimer, the term of this patent is extended or adjusted under 35 U.S.C. 154(b) by 0 days.

(21) Appl. No.: 15/508,589

(22) PCT Filed: Jul. 29, 2016

(86) PCT No.: PCT/CN2016/092329
§ 371 (c)(1),
(2) Date: Mar. 3, 2017

(87) PCT Pub. No.: WO2017/096923
PCT Pub. Date: Jun. 15, 2017

(65) Prior Publication Data
US 2018/0146098 A1 May 24, 2018

(30) Foreign Application Priority Data

Dec. 7, 2015 (CN) .......................... 2015 1 0887118

(51) Int. Cl.
*H04B 1/38* (2015.01)
*H04M 9/08* (2006.01)
*H04M 1/60* (2006.01)

(52) U.S. Cl.
CPC ........... *H04M 9/08* (2013.01); *H04M 1/6041* (2013.01)

(58) Field of Classification Search
CPC ............ H04M 1/03; H04M 1/21; H04M 1/19; H04M 1/6008
USPC ....................................................... 455/570
See application file for complete search history.

(56) References Cited

U.S. PATENT DOCUMENTS

| 6,724,899 | B1 | 4/2004 | Taeger | |
| 2011/0194685 | A1* | 8/2011 | van de Laar | H04M 9/082 379/406.01 |
| 2013/0301844 | A1* | 11/2013 | Konchitsky | H04R 3/002 381/71.1 |
| 2014/0334620 | A1* | 11/2014 | Yemdji | G10L 21/0232 379/406.08 |

(Continued)

FOREIGN PATENT DOCUMENTS

| CN | 102196079 A | 9/2011 |
| CN | 102624961 A | 8/2012 |

(Continued)

*Primary Examiner* — Ajibola A Akinyemi
(74) *Attorney, Agent, or Firm* — Shimokaji IP

(57) ABSTRACT

A method and system for improving an echo in a hands-free call of a mobile terminal may include the mobile terminal comprising a speaker, a primary microphone and an auxiliary microphone; the distance from the primary microphone to the speaker can be less than that from the auxiliary microphone to the speaker; and the method may include using the auxiliary microphone to acquire outside sound during a hands-free call.

17 Claims, 3 Drawing Sheets

(56) References Cited

U.S. PATENT DOCUMENTS

2015/0078606 A1* 3/2015 Zhang .................. H04M 1/035
                                                    381/365
2017/0133032 A1* 5/2017 Wang ..................... H04M 1/19

FOREIGN PATENT DOCUMENTS

| CN | 102946493 A | 2/2013 |
| CN | 105530391 A | 4/2016 |

* cited by examiner

Use the auxiliary microphone to acquire outside sound, and use the main microphone to acquiring environmental noise during a hands-free call; filter out the environmental noise according to the outside sound acquired by the auxiliary microphone and the environmental noise acquired by the main microphone so as to obtain the user's voice;
use the main microphone to acquire outside sound, and use the auxiliary microphone to acquire environmental noise during a handheld call; filter out the environmental noise acquired by the auxiliary microphone according to the outside sound acquired by the main microphone and the environmental noise acquired by the auxiliary microphone so as to obtain the user's voice. — S10

Fig. 2

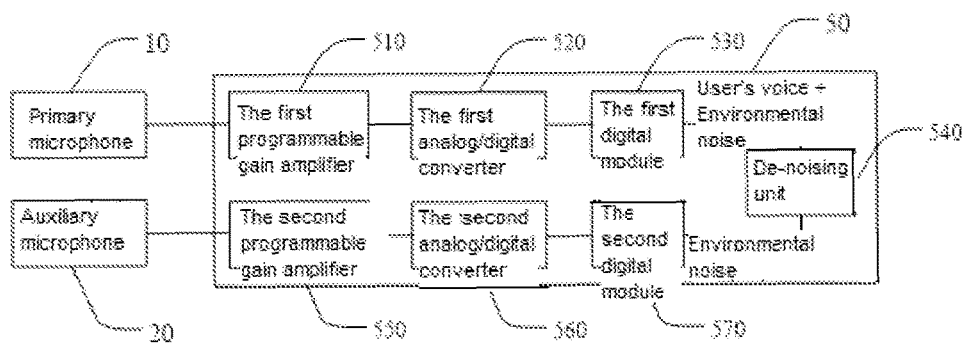

Fig. 3

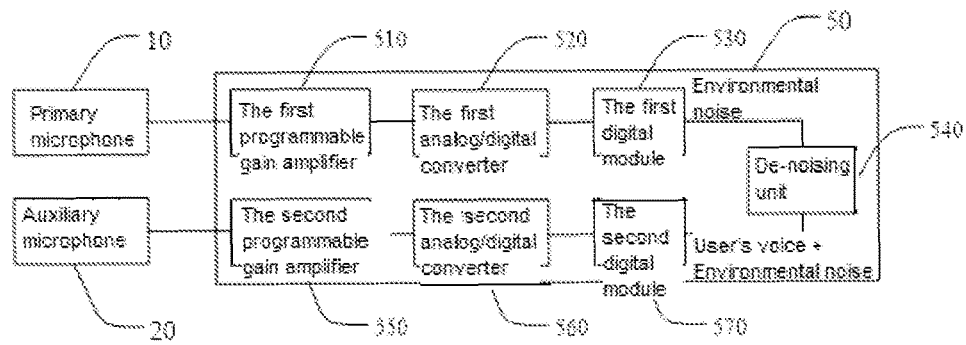

Fig. 4

METHOD AND SYSTEM FOR IMPROVING ECHO IN HANDS-FREE CALL OF MOBILE TERMINAL

TECHNICAL FIELD

The present invention relates to the field of mobile communication, and particularly relates to a method and system for improving echo in a hands-free call of a mobile terminal.

BACKGROUND OF THE PRESENT INVENTION

In the development trend of increased use of function modules and decreasing size, stacking space of a mobile phone becomes increasingly tight. Currently, for PCB placement of the mobile phone, it is very crowded in a top space of the mobile phone, and a large speaker has to be placed on a bottom of the mobile phone.

In order to ensure the mobile phone picks up a user's voice and eliminates environmental noise normally, the mobile phone is designed to adopt a dual-microphone de-noising design. The dual-microphone de-noising algorithm requires that: signal-to-noise ratio of the primary microphone and that of the auxiliary microphone shall have obvious difference; if the difference is greater, it is more favorable to de-noising. Therefore, the primary microphone is arranged on the bottom of the mobile phone, as close to the mouth of the human as possible, to pick up the voice in the handheld mode; and the auxiliary microphone is arranged on the top of the mobile phone to pick up the environmental noise.

This placement design may be a test for the hands-free call quality of the mobile phone: the hands-free call may require a high volume of the speaker, but the speaker and the primary microphone may be too close; the voice on the other end, after being broadcast by the speaker, can be picked up by the native primary microphone and sent to the other end, which may cause a serious echo problem. The echo means that, during a call, the voice from the other end, after being broadcast by the speaker, is picked up by the native microphone and sent to the other end, and the sound of one's own voice at the other end can be heard on the mobile phone of oneself, this sound being the echo, and the echo can be serious during a hands-free call.

Therefore the existing technology still needs to be improved and enhanced.

SUMMARY OF THE PRESENT INVENTION

With regard to shortcomings of existing technology, the present invention aims to provide a method and system for improving echo in a hands-free call of a mobile terminal to improve the echo during a hands-free call.

To achieve the objective mentioned above, the present invention adopts the following technical scheme:

a system for improving echo in a hands-free call of a mobile terminal, comprising a speaker, a primary microphone, an auxiliary microphone and a screen, wherein a distance from the primary microphone to the speaker is less than the distance from the auxiliary microphone to the speaker;

the primary microphone is arranged on the bottom of the mobile terminal, the auxiliary microphone is arranged on the top of the mobile terminal and at the upper end of the screen, the speaker is affixed at a lower end of the screen, and the auxiliary microphone and the speaker are on a diagonal line of the screen;

and the auxiliary microphone is used for acquiring outside sound during a hands-free call.

In the system for improving echo in a hands-free call of a mobile terminal, the primary microphone can be used for acquiring outside sound during a handheld call.

In the system for improving echo in a hands-free call of a mobile terminal, the outside sound comprises a user's voice and environmental noise.

In the system for improving echo in a hands-free call of a mobile terminal, the system further comprises a de-noising module;

the primary microphone is further used for acquiring environmental noise during a hands-free call;

the auxiliary microphone is further used for acquiring environmental noise during a handheld call;

the de-noising module can be used for filtering out the environmental noise acquired by the primary microphone according to the outside sound acquired by the auxiliary microphone and the environmental noise acquired by the primary microphone to obtain the user's voice, and for filtering out the environmental noise acquired by the auxiliary microphone according to the outside sound acquired by the primary microphone and the environmental noise acquired by the auxiliary microphone to obtain the user's voice.

A method for improving echo in a hands-free call of a mobile terminal, wherein the mobile terminal comprises a speaker, a primary microphone and an auxiliary microphone, and a distance from the primary microphone to the speaker is less than that from the auxiliary microphone to the speaker; the method comprises:

using the auxiliary microphone to acquire outside sound during a hands-free call.

In the method for improving echo in a hands-free call of a mobile terminal, the method further comprises: using the primary microphone to acquire outside sound during a handheld call.

In the method for improving echo in a hands-free call of a mobile terminal, the outside sound comprises a user's voice and environmental noise.

In the method for improving echo in a hands-free call of a mobile terminal, the auxiliary microphone is used for acquiring outside sound during a hands-free call, the primary microphone is can be used for acquiring environmental noise; the environmental noise acquired by the primary microphone can be filtered out according to the outside sound acquired by the auxiliary microphone and the environmental noise acquired by the primary microphone to obtain the user's voice;

the primary microphone can be used for acquiring outside sound during a handheld call, the auxiliary microphone can be used for acquiring environmental noise; the environmental noise acquired by the auxiliary microphone can be filtered out according to the outside sound acquired by the primary microphone and the environmental noise acquired by the auxiliary microphone to obtain the user's voice.

In the method for improving echo in a hands-free call of a mobile terminal, the primary microphone can be arranged on the bottom of the mobile terminal, and the auxiliary microphone can be arranged on the top of the mobile terminal.

A system for improving echo in a hands-free call of a mobile terminal, comprising a speaker, a primary microphone and an auxiliary microphone, and a distance from the primary microphone to the speaker may be less than that from the auxiliary microphone to the speaker; and the auxiliary microphone can be used for acquiring outside sound during a hands-free call.

In the system for improving echo in a hands-free call of a mobile terminal, the primary microphone can be used for acquiring outside sound during a handheld call.

In the system for improving echo in a hands-free call of a mobile terminal, the outside sound may comprise a user's voice and environmental noise.

In the system for improving echo in a hands-free call of a mobile terminal, the system for improving echo in a hands-free call of a mobile terminal may further comprise a de-noising module;

the primary microphones may be further used for acquiring environmental noise during a hands-free call;

the auxiliary microphone may be further used for acquiring environmental noise during a handheld call;

the de-noising module can be used for filtering out the environmental noise acquired by the primary microphone according to the outside sound acquired by the auxiliary microphone and the environmental noise acquired by the primary microphone to obtain the user's voice; and for filtering out the environmental noise acquired by the auxiliary microphone according to the outside sound acquired by the primary microphone and the environmental noise acquired by the auxiliary microphone.

In the system for improving echo in a hands-free call of a mobile terminal, the primary microphone can be arranged on a bottom of the mobile terminal, and the auxiliary microphone can be arranged on a top of the mobile terminal.

With comparison to the existing technology, a method and system for improving echo in a hands-free call of a mobile terminal is provided by the present invention, wherein the mobile terminal comprises a speaker, a primary microphone and an auxiliary microphone; a distance from the primary microphone to the speaker can be less than that from the auxiliary microphone to the speaker; and the method comprises: using the auxiliary microphone to acquire outside sound during a hands-free call. The auxiliary microphone may be far from the speaker, which may improve the echo.

BRIEF DESCRIPTION OF THE DRAWINGS

FIG. 2 shows a flow chart of a method for improving echo in a hands-free call of a mobile terminal provided by the present invention;

FIG. 3 shows a diagram illustrating voice processing procedure of a primary microphone and an auxiliary microphone during a hands-free call of an existing mobile terminal;

FIG. 4 shows a diagram illustrating voice processing procedure of a primary microphone and an auxiliary microphone during a hands-free call in a method for improving echo in a hands-free call of a mobile terminal provided by the present invention;

DETAILED DESCRIPTION OF THE PRESENT INVENTION

The present invention provides a method and system for improving echo in a hands-free call of a mobile terminal. In order to make the objective, technical solution and effect of the present invention clearer and more explicit, the present invention is further described in detail with reference to the accompanying drawings and specific embodiments below. It shall be understood that the embodiments described in detail are merely used for explaining the present invention and shall not be regarded as any limitations thereto.

Figure 1:
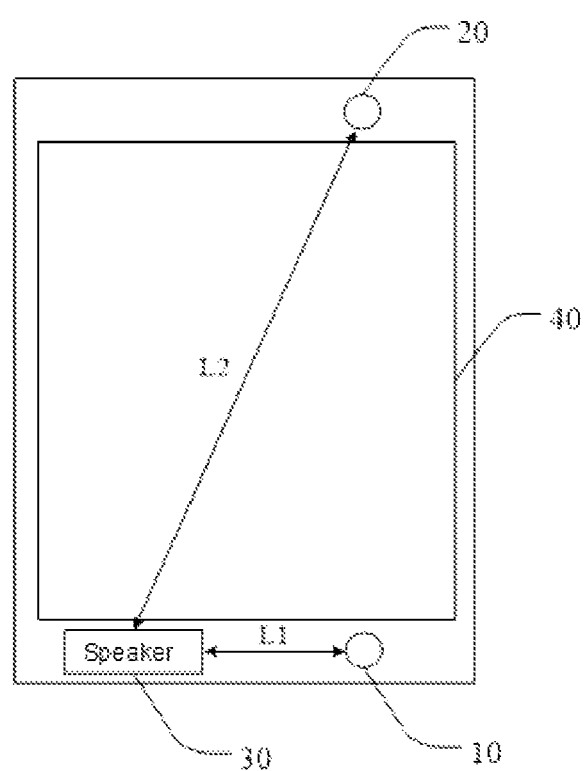
FIG. 1 shows a structure diagram of a mobile terminal in a method for improving echo in a hands-free call of a mobile terminal provided by the present invention.

With reference to FIG. 1, a method for improving echo in a hands-free call of a mobile terminal is provided by the present invention, the mobile terminal may comprise a speaker 30, a primary microphone 10, an auxiliary microphone 20 and a screen 40, and a distance from the primary microphone 10 to the speaker can be less than that from the auxiliary microphone 20 to the speaker 30. The method may comprise the following steps: S10. using the auxiliary microphone 20 to acquire outside sound during a hands-free call. The auxiliary microphone 20 may be far from the speaker 30, which can improve the echo. A mobile terminal may have multiple speakers, and the speaker 30 of the present invention may refer to a speaker broadcasting the voice during a hands-free call.

The mobile terminal may include a mobile phone, a tablet computer or other electronic equipment capable of realizing voice communication.

During a call, the voice from the other end of the mobile terminal may be received by the native device; after being broadcast by a sounding apparatus (speaker 30 during hands-free call); the voice may be picked up by the native microphone and sent to the other end of the mobile terminal; the sound of one's own voice at the other end of the mobile terminal can be heard on the mobile phone, which is the echo. Volume of the echo may be related to acoustic isolation conditions between the speaker 30 and the microphone. In the field, sound pressure difference between the distance points sound source r1 and r2 may be in the following relation:

$$\Delta = SPL_{r2} - SPL_{r1} = -20\log\frac{r2}{r1},\qquad\text{Formula 1,}$$

where, $SPL_{r2}$ is the sound pressure at point r2, and $SPL_{r1}$ is the sound pressure at point r1. It can be seen that the farther the microphone is from the sounding apparatus, the more the echo is improved.

In FIG. 1, the distance from the primary microphone 10 to the speaker 30 is L1, and the distance from the auxiliary microphone 20 to the speaker 30 is L2. Then, when the speaker 30 causes sound, a difference value between the sound pressure of the auxiliary microphone 20 $SPL_{L2}$ and the sound pressure of the primary microphone 10 $SPL_{L1}$ may be:

$$\Delta = SPL_{L2} - SPL_{L1} = -20\log\frac{L2}{L1},\qquad\text{Formula 2.}$$

A dual-microphone design scheme is adopted in the present embodiment, the primary microphone 10 may be arranged on the bottom of the mobile terminal, and the auxiliary microphone 20 may be arranged on the top of the mobile terminal. The auxiliary microphone 20 on the top and the primary microphone 10 on the bottom may be symmetrically arranged on the mobile terminal.

The speaker 30 can be arranged as far as possible from the auxiliary microphone 20. The auxiliary microphone 20 can be arranged at the upper end of the screen 40; the speaker 30 can be arranged at the lower end of the screen 40; and the auxiliary microphone 20 and the speaker 30 can be on the diagonal line of the screen 40, where the diagonal line may not be proper, and may just be approximate to possibly open the distance from the auxiliary microphone 20 to the speaker 30. With a common 5-inch mobile phone as an example for the mobile terminal, the distance L1 from the primary microphone 10 to the speaker may be about 2 cm (calculated as 2 cm), and the distance L2 from the auxiliary microphone 20 to the speaker 30 may be about 12 cm (calculated as 12 cm). By using the Formula 2, it can be calculated that the sound pressure level of the echo at the auxiliary microphone 20 may be 15.56 dB lower than that at the primary microphone 10. In other words, the difference value between the sound pressure of the auxiliary microphone 20 $SPL_{L2}$ and the sound pressure of the primary microphone 10 $SPL_{L1}$ may be:

$$\Delta = SPL_{L2} - SPL_{L1} = -20\log\frac{L2}{L1} = -20\log\frac{12}{2} = -15.56 \text{ dB}.$$

Thus, compared with the traditional method of adopting a primary microphone 10 to acquire outside sound, the method of adopting an auxiliary microphone 20 to acquire the outside sound can prevent echo trouble.

Further, the step S10 also may comprise: using the primary microphone 10 to acquire the outside sound during a handheld call. Modes of mobile phone call can include hands-free call, handheld call, common headset call, and a Bluetooth headset call. A handheld call may mean a user holds a mobile phone in hand and places it near his ear to make a call; in other words, when a user holds a mobile phone in hand and places it near his ear to make a call, a primary microphone 10 may be used for acquiring an outside sound. Since the distance from the primary microphone 10 to a vocal organ of a user may be less than that from the auxiliary microphone 20 to the vocal organ of the user, and an echo of a handheld call can be extremely faint, such setting may ensure call quality in a handheld call.

The outside sound may include a user's voice and environmental noise, and the user's voice may need to be transmitted to the other end, while the environmental noise may need to be filtered out.

With reference to FIG. 2, the step S10 may comprise:

During a hands-free call, the auxiliary microphone 20 may be used for acquiring outside sound, and the primary microphone 10 may be used for acquiring environmental noise; the environmental noise can be filtered out to obtain the user's voice according to the outside sound acquired by the auxiliary microphone 20 and the environmental noise acquired by the primary microphone 10. Using the primary microphone 10 to acquire the environmental noise may not mean that the primary microphone 10 only acquires the environmental noise, it may mean that among the outside sound acquired by the primary microphone 10 during a hands-free call, the environmental noise (such as echo) is in the majority, and its purpose is to obtain the environmental noise. After acquiring the outside sound and the environmental noise, the mobile terminal can obtain the user's voice merely by filtering out the audio in the outside sound which may approximate the environmental noise, so that the noise in the environmental is eliminated.

During a handheld call, the primary microphone 10 can be used to acquire outside sound, and the auxiliary microphone 20 can be used to acquire environmental noise; the environmental noise can be filtered out to obtain the user's voice based on the outside sound acquired by the primary microphone 10 and the environmental noise acquired by the auxiliary microphone 20. Using the auxiliary microphone 20 to acquire the environmental noise does not mean that the auxiliary microphone 20 only acquires the environmental noise; it means that among the outside sound acquired by the auxiliary microphone 20 during a handheld call, the environmental noise (such as vehicle horn sound, noisy sound in a restaurant, etc.) is in the majority, and its purpose is to obtain the environmental noise. After acquiring the outside sound and the environmental noise, the mobile terminal can obtain user's voice merely by filtering out the audio in the outside sound which can approximate the environmental noise, so that the noise in the environmental is eliminated.

When a traditional mobile phone with dual-microphone de-noising function is in a hands-free call, as shown in FIG. 3, the primary microphone and the auxiliary microphone may be totally symmetric on a hardware circuit. In FIG. 3, the first programmable gain amplifier 510 and the second programmable gain amplifier 550 of the de-noising module are the same, the first analog/digital converter 520 and the second analog/digital converter 560 are the same, and the first digital module 530 and the second digital module 570 are the same. In this software, the primary microphone is set as the role for picking up user's voice and environmental noise, and the auxiliary microphone is set as the role for picking up environmental noise. At this moment, the primary microphone for picking up user's voice may be closer to the speaker, and may produce a higher echo.

A method for improving echo in a hands-free call of a mobile terminal is provided by the present invention, in a hands-free call. As shown in FIG. 4, the hardware circuit is the same as the hardware for a hands-free call of a traditional mobile phone; that is, the primary microphone and the auxiliary microphone may be totally symmetric on the hardware circuit. The difference is that, in this software, the auxiliary microphone may be set as the role for picking up the user's voice and environmental noise, and the primary microphone may be set as the role for picking up environmental noise; at this moment, the auxiliary microphone for picking up the user's voice may be closer to the speaker, and an echo effect may be much less.

It can be seen that the method provided by the present invention does not need to change the common acoustic structure design and the hardware circuit, and the scheme of the present invention can be easily realized by providing a simple configuration on the software to exchange roles of the primary and auxiliary microphones to realize less difficulty and low cost.

Thus, the method provided by the present invention improves echo in a hands-free call by using the auxiliary microphone to replace the primary microphone to pick up the user's voice, thereby improving the echo trouble from the source of the echo by increasing the distance between the speaker and the microphone for picking up the user's voice.

Figure 5:
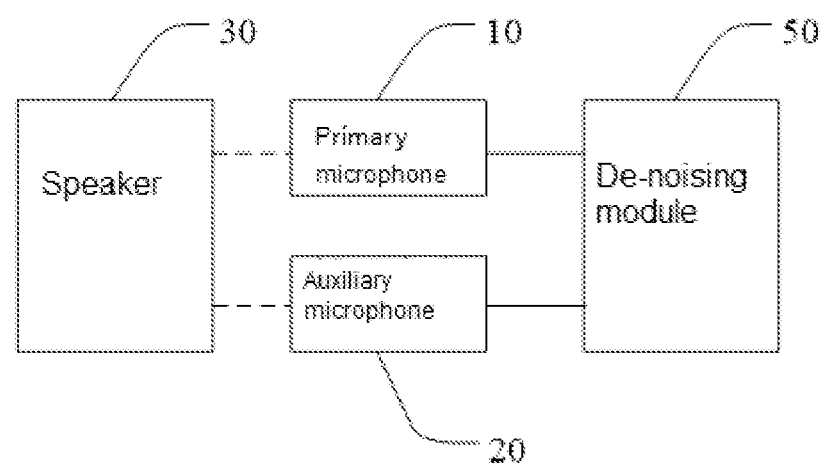
FIG. 5 shows a structure block diagram of a system for improving echo in a hands-free call of a mobile terminal provided by the present invention.

The present invention may further provide a system for improving echo in a hands-free call of a mobile terminal based on the embodiments, with reference to FIG. 1 and FIG. 5, the system for improving echo in a hands-free call of a mobile terminal may comprise a speaker 30, a primary microphone 10, an auxiliary microphone 20, a screen 40 and a de-noising module 50. The distance from the primary microphone 10 to the speaker 30 may be less than that from the auxiliary microphone 20 to the speaker 30; and the auxiliary microphone 20 may be used for acquiring outside sound during a hands-free call. The auxiliary microphone 20 may be far from the speaker 30, which can improve the echo. A mobile terminal may have multiple speakers, and the speaker 30 of the present invention refers to a speaker broadcasting the voice to the other side of the mobile terminal during a hands-free call.

The mobile terminal can include a mobile phone, a tablet computer or other electronic equipment capable of realizing voice communication.

During a call, the voice from the other end may be received by the native device; after being broadcast by a sounding apparatus (speaker 30 during hands-free call), the voice can be picked up by the native microphone and sent to the other end of the mobile terminal; the sound of one's own voice at the other end of the mobile terminal can be heard on the mobile phone, which is the echo. Volume of the echo may be related to acoustic isolation conditions between the speaker 30 and the microphone. In the field, sound pressure difference between the distance points sound source r1 and r2 may be in the following relation:

$$\Delta = SPL_{r2} - SPL_{r1} = -20\log\frac{r2}{r1}, \qquad \text{Formula 3,}$$

where, $SPL_{r2}$ is the sound pressure at point r2, and $SPL_{r1}$ the sound pressure at point r1. It can be seen that the farther the microphone is from the sounding apparatus, the more improved the echo may be.

In FIG. 1, the distance from the primary microphone 10 to the speaker 30 is L1, and the distance from the auxiliary microphone 20 to the speaker 30 is L2. When the speaker 30 causes sound, a difference value between the sound pressure of the auxiliary microphone 20 $SPL_{L2}$ and the sound pressure of the primary microphone 10 $SPL_{L1}$ may be:

$$\Delta = SPL_{L2} - SPL_{L1} = -20\log\frac{L2}{L1}, \qquad \text{Formula 4.}$$

A dual-microphone design scheme is adopted in the present embodiment, the primary microphone 10 may be arranged on the bottom of the mobile terminal, and the auxiliary microphone 20 may be arranged on the top of the mobile terminal. The auxiliary microphone 20 on the top and the primary microphone 10 on the bottom can be symmetrically arranged on the mobile terminal.

The speaker 30 may be arranged as far as possible from the auxiliary microphone 20. The auxiliary microphone 20 may be arranged at the upper end of the screen 40, the speaker 30 can be arranged at the lower end of the screen 40, and the auxiliary microphone 20 and the speaker 30 can be on the diagonal line of the screen 40, where the diagonal line may not be proper, and may just be approximate to open the distance from the auxiliary microphone 20 to the speaker 30. With a common 5-inch mobile phone as an example for the mobile terminal, the distance L1 from the primary microphone 10 to the speaker 30 can be about 2 cm (calculated as 2 cm), and the distance L2 from the auxiliary microphone 20 to the speaker 30 can be about 12 cm (calculated as 12 cm); by using the Formula 4, it can be calculated that the sound pressure level of the echo at the auxiliary microphone 20 is 15.56 dB lower than that at the primary microphone 10; in other words, the difference value between the sound pressure of the auxiliary microphone 20 $SPL_{L2}$ and the sound pressure of the primary microphone 10 $SPL_{L1}$ may be:

$$\Delta = SPL_{L2} - SPL_{L1} = -20\log\frac{L2}{L1} = -20\log\frac{12}{2} = -15.56 \text{ dB.}$$

Thus, compared with a traditional method of adopting a primary microphone 10 to acquire outside sound, the method of adopting an auxiliary microphone 20 to acquire the outside sound can prevent echo trouble.

Furthermore, the primary microphone 10 can be used for acquiring outside sound during a handheld call. In other words, the primary microphone 10 can be used for acquiring outside sound during a handheld call. Since the distance from the primary microphone 10 to a vocal organ of a user may be less than that from the auxiliary microphone 20 to the vocal organ of the user, and an echo of a handheld call may be extremely faint, such setting may ensure call quality in the mode of a handheld call.

The outside sound may include the user's voice and environmental noise, and the user's voice may need to be transmitted to the other end, while the environmental noise may need to be filtered out.

The primary microphone 10 can be used for acquiring environmental noise during a hands-free call; and for acquiring the outside sound during a handheld call.

The auxiliary microphone 20 can be used for acquiring outside sound during a hands-free call; and for acquiring environmental noise during a handheld call.

The de-noising module 50 can be used for filtering out the environmental noise according to the outside sound acquired by the auxiliary microphone 20 and the environmental noise acquired by the primary microphone 10 to obtain the user's voice; and it can be used for filtering out the environmental noise according to the outside sound acquired by the primary microphone 10 and the environmental noise acquired by the auxiliary microphone 20 to obtain the user's voice.

The primary microphone 10 for acquiring the environmental noise does not mean that the primary microphone 10 only acquires the environmental noise. It means that among the outside sound acquired by the primary microphone 10 during a hands-free call, the environmental noise (such as echo) may be in the majority, and its purpose is to obtain the environmental noise. After acquiring the outside sound and the environmental noise, the de-noising module 50 can obtain user's voice by filtering out the audio in the outside sound which may approximate the environmental noise, so that the noise in the environmental can be eliminated.

The auxiliary microphone 20 for acquiring the environmental noise does not mean that the auxiliary microphone 20 only acquires the environmental noise. It means that among the outside sound acquired by the auxiliary microphone 20 during a hands-free call, the environmental noise (such as echo) may be in the majority, and its purpose is to obtain the environmental noise. After acquiring the outside sound and the environmental noise, the de-noising module 50 can obtain user's voice by filtering out audio in the outside sound which may approximate the environmental noise, so that the noise in the environmental is eliminated.

The de-noising module 50 may comprise a first programmable gain amplifier 510, a first analog/digital converter 520, a first digital module 530, a de-noising unit 540, a second programmable gain amplifier 550, a second analog/digital converter 560 and a second digital module 570. The first programmable gain amplifier 510 and the second programmable gain amplifier 550 of the de-noising module may be the same, the first analog/digital converter 520 and the second analog/digital converter 560 may be the same, and the first digital module 530 and the second digital module 570 may be the same. In other words, the primary microphone 10 and the auxiliary microphone 20 may be totally symmetric on a hardware circuit.

The first programmable gain amplifier 510 and the second programmable gain amplifier 550 may be amplifiers with very strong universality, and their amplification factors can be controlled through a program according to the need. For adoption of this kind of amplifier, the amplification factor can be adjusted through a program to realize uniformity of a full-scale signal of an ND converter to greatly improve measurement accuracy.

The first analog/digital converter 520 and the second analog/digital converter 560 can be used for converting analog signals of continuous variables into discrete digital signals.

The first digital module 530 and the second digital module 570 can be used for correlation processing of the digital signal, such as filtering.

The de-noising unit 540 can be used for filtering out sound signals corresponding to the environmental noise according to the sound signals output by the first digital module 530 and the second digital module 570 to realize the function of de-noising.

Thus, in a hands-free call of a traditional mobile phone, as shown in FIG. 3, the primary microphone and the auxiliary microphone may be totally symmetric on a hardware circuit. In this software, the primary microphone may be set with the role for picking up the user's voice and environmental noise, and the auxiliary microphone can be set with the role for picking up environmental noise; at this moment, the primary microphone for picking up user's voice may be closer to the speaker, and it may be easy to produce a higher echo.

A system for improving echo in a hands-free call of a mobile terminal is provided by the present invention, in a hands-free call. As shown in FIG. 4, the hardware circuit may be the same as the hardware for a hands-free call at present, that is, the primary microphone and the auxiliary microphone may be totally symmetric on the hardware circuit. The difference may be that, in this software, the auxiliary microphone may be set with the role for picking up the user's voice and environmental noise, and the primary microphone may be set with the role for picking up environmental noise; at this moment, the auxiliary microphone for picking up user's voice may be closer to the speaker, and the echo effect may be much less.

It can be seen that the system provided by the present invention may not need to change the common acoustic structure design and the hardware circuit, and the scheme of the present invention can be easily realized by providing a simple configuration on the software to exchange roles of the primary and auxiliary microphones to realize less difficulty and low cost.

Thus, the system provided by the present invention can improve echo in a hands-free call by using the auxiliary microphone to replace the primary microphone to pick up the user's voice, that is, improving the echo trouble from the source of echo by increasing the distance between the speaker and the microphone for picking up the user's voice.

The function module dividing is only for illustration. In practical application, the function allocation can be completed by different function modules according to need, namely dividing into different function modules to complete all or part of the function.

The person of ordinary skill in the art can understand all or part of flows in the method of the embodiments can be completed through related hardware instructed by a computer (mobile terminal) program. The computer (mobile terminal) program, can be stored in accessible storage medium of a computer (mobile terminal), and flows of embodiments of various methods are included in execution of the program. The storage medium can be a magnetic disk, a CD, a read only memory (ROM) or a random access memory (RAM).

A system for improving echo in a hands-free call of a mobile terminal can be provided by the present embodiment, and a mobile terminal can be further provided by the present invention. The mobile terminal can comprise the system for improving echo in a hands-free call of a mobile terminal. Particular technical features of the mobile terminal have been elaborated in the present embodiment and need not be repeated here.

It shall be understood that, to a person of ordinary skill in the art, various substitutions and modifications may be made without departing from the spirit and essence of the present invention, and these modifications or substitutions shall be regarded as falling into the protection scope of the present invention.

The invention claimed is:

1. A system for improving echo in a hands-free call of a mobile terminal, comprising:
a speaker; a primary microphone; an auxiliary microphone; a de-noising module; and a screen, wherein a distance from the primary microphone to the speaker is less than that from the auxiliary microphone to the speaker, wherein the distance from the auxiliary microphone to the speaker is based on a sound pressure of a sound at the auxiliary microphone;
the primary microphone is affixed on the bottom of the mobile terminal, the auxiliary microphone is affixed on a top of the mobile terminal and at an upper end of the screen, the speaker is affixed at a lower end of the screen, and the auxiliary microphone and the speaker are on a diagonal across the screen from each other, so the distance from the primary microphone to the speaker is less than that from the auxiliary microphone to the speaker;
the de-noising module comprises a first programmable gain amplifier, a first analog/digital converter, a first digital module, a de-noising unit, a second programmable gain amplifier, a second analog/digital converter, a second digital module;
the primary microphone is coupled to the first programmable gain amplifier and the auxiliary microphone is coupled to the second programmable gain amplifier;
the auxiliary microphone is used for acquiring outside sound during a hands-free call, wherein the acquired outside sound comprises a user's voice and an environmental noise; and
the primary microphone is used for acquiring the environmental noise during the hands-free call.

2. The system for improving echo in a hands-free call of a mobile terminal according to claim 1, wherein the primary microphone is used for acquiring outside sound during a handheld call.

3. The system for improving echo in a hands-free call of a mobile terminal according to claim 2, wherein:
the auxiliary microphone is further used for acquiring environmental noise during the handheld call;
the de-noising module is used for filtering out the environmental noise acquired by the primary microphone according to the outside sound acquired by the auxiliary microphone and environmental noise acquired by the primary microphone to obtain the user's voice during the hands-free call, and for filtering out the environmental noise acquired by the auxiliary microphone according to the outside sound acquired by the primary microphone and environmental noise acquired by the auxiliary microphone to obtain the user's voice during the handheld call.

4. The system of claim 1, wherein the mobile terminal is a mobile phone.

5. The system of claim 1, wherein the mobile terminal is a tablet computer.

6. A method for improving echo in a hands-free call of a mobile terminal,
wherein the mobile terminal comprises a speaker, a de-noising module, a primary microphone and an auxiliary microphone,
wherein the de-noising module comprises a first programmable gain amplifier, a first analog/digital converter, a first digital module, a de-noising unit, a second programmable gain amplifier, a second analog/digital converter, a second digital module, wherein the first programmable gain amplifier and the second programmable gain amplifier are identical, the first analog/digital converter and the second analog/digital converter are identical, the first digital module and the second digital module are identical;
the primary microphone is coupled to the first programmable gain amplifier and the auxiliary microphone is coupled to the second programmable gain amplifier, and
wherein a distance from the primary microphone to the speaker is less than that from the auxiliary microphone to the speaker, wherein the distance from the auxiliary microphone to the speaker is based on a sound pressure of a sound at the auxiliary microphone and the distance of the primary microphone to the speaker is based on a sound pressure of the sound at the primary microphone, the method comprising:
using the auxiliary microphone to acquire outside sound during a hands-free call, wherein the outside sound comprises a user's voice and an environmental noise;
using the primary microphone to acquire the environmental noise during the hands-free call; and
filtering out, via the de-noising module, the environmental noise acquired by the primary microphone according to the outside sound acquired by the auxiliary microphone and the environmental noise acquired by the primary microphone to obtain the user's voice during the hands-free call.

7. The method for improving echo in a hands-free call of a mobile terminal according to claim 6, wherein the method further comprises: using the primary microphone to acquire the outside sound during a handheld call.

8. The method for improving echo in a hands-free call of a mobile terminal according to claim 7, wherein,
when the primary microphone is used for acquiring outside sound during a handheld call, the method further comprises: using the auxiliary microphone to acquire environmental noise; filtering out the environmental noise acquired by the auxiliary microphone according to the outside sound acquired by the primary microphone and the environmental noise acquired by the auxiliary microphone to obtain the user's voice.

9. The method for improving echo in a hands-free call of a mobile terminal according to claim 6, wherein the primary microphone is arranged on a bottom of the mobile terminal, and the auxiliary microphone is arranged on a top of the mobile terminal.

10. The method of claim 6, wherein the mobile terminal is a mobile phone.

11. The method of claim 6, wherein the mobile terminal includes a screen, and the speaker and the auxiliary microphone are affixed at opposite ends of the screen.

12. A system for improving echo in a hands-free call of a mobile terminal, comprising a speaker; a primary microphone; an auxiliary microphone; and a de-noising module,
wherein the de-noising module comprises a first programmable gain amplifier, a first analog/digital converter, a first digital module, a de-noising unit, a second programmable gain amplifier, a second analog/digital converter, a second digital module, wherein the first programmable gain amplifier and the second programmable gain amplifier are identical, the first analog/digital converter and the second analog/digital converter are identical, the first digital module and the second digital module are identical;
the primary microphone is coupled to the first programmable gain amplifier and the auxiliary microphone is coupled to the second programmable gain amplifier, so that the primary microphone and the auxiliary microphone are symmetric on a hardware circuit,
wherein a distance from the primary microphone to the speaker is less than that from the auxiliary microphone to the speaker, wherein the distance from the auxiliary microphone to the speaker is based on a sound pressure of an echo from the auxiliary microphone;
the auxiliary microphone is used for acquiring outside sound during a hands-free call, wherein the outside sound comprises a user's voice and an environment noise;
the primary microphone is used for acquiring the environmental noise during the hands-free call; and
wherein the de-noising module is used for filtering out the environmental noise acquired by the primary microphone according to the outside sound acquired by the auxiliary microphone and the environmental noise acquired by the primary microphone to obtain the user's voice during the hands-free call.

13. The system for improving echo in a hands-free call of a mobile terminal according to claim 12, wherein the primary microphone is used for acquiring the outside sound during a handheld call.

14. The system for improving echo in a hands-free call of a mobile terminal according to claim 13, wherein
the auxiliary microphone is further used for acquiring the environmental noise during the handheld call;
the de-noising module is used for filtering out the environmental noise acquired by the auxiliary microphone according to the outside sound acquired by the primary microphone and the environmental noise acquired by the auxiliary microphone during the handheld call.

15. The system for improving echo in a hands-free call of a mobile terminal according to claim 12, wherein the primary microphone is affixed to a bottom of the mobile terminal, and the auxiliary microphone is affixed to a top of the mobile terminal.

16. The system of claim 12, wherein the mobile terminal is a mobile phone.

17. The system of claim 12, wherein the mobile terminal includes a screen, and the speaker and the auxiliary microphone are affixed at opposite ends of the screen, diagonally across the screen from each other.

* * * * *